March 4, 1958    J. W. WARDEN, SR., ET AL    2,825,144
ILLUMINATED COMBINATION LEVEL
Filed Dec. 5, 1956

INVENTOR
JOHN W. WARDEN SR.
FORREST E. MAJOR

BY
ATTORNEYS

United States Patent Office 2,825,144
Patented Mar. 4, 1958

2,825,144

ILLUMINATED COMBINATION LEVEL

John W. Warden, Sr., and Forrest E. Major, El Paso, Tex.

Application December 5, 1956, Serial No. 626,543

6 Claims. (Cl. 33—213)

This invention relates to measuring instruments and more particularly to a combination illuminated level which may be utilized to determine the aspect of horizontal, vertical or inclined objects or members.

Numerous types of levels of this general character have heretofore been proposed and utilized, but, in general, these have been relatively costly instruments, particularly where means has been provided to determine the angular relationship of an inclined member to the horizontal or vertical and, furthermore, these prior art instruments have required relatively good light in which to utilize the same, since the level tubes are usually located in recesses and observation of the bubble therein is relatively difficult in poor lighting conditions.

It is accordingly an object of the invention to provide an illuminated combination level which may be conveniently and economically constructed from readily available materials and of sufficient strength to maintain a high degree of accuracy.

A further object of the invention is the provision of an illuminated combination level which may be utilized to determine the aspect of horizontal, vertical or inclined members or objects and including fixed aspect indicating devices, as well as an adjustable aspect indicating device.

A still further object of the invention is the provision of an illuminated combination level including aspect indicating devices and a self-contained source of illumination, including an electric lamp, a battery and a switch for controlling operation of the lamp thereby permitting efficient use of the instrument in poor lighting conditions.

Figure 1:
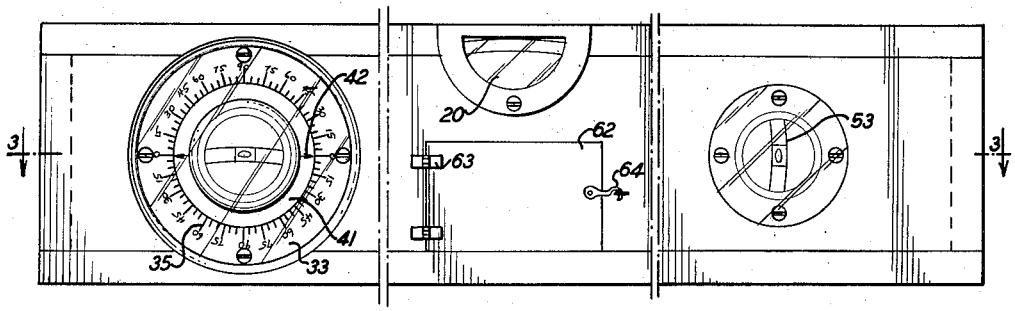
Figure 2:
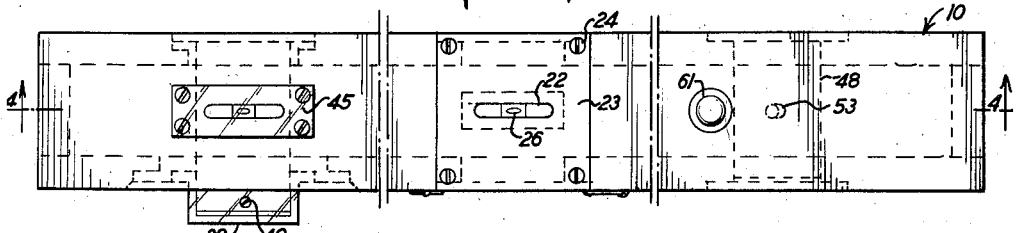
Figure 3:
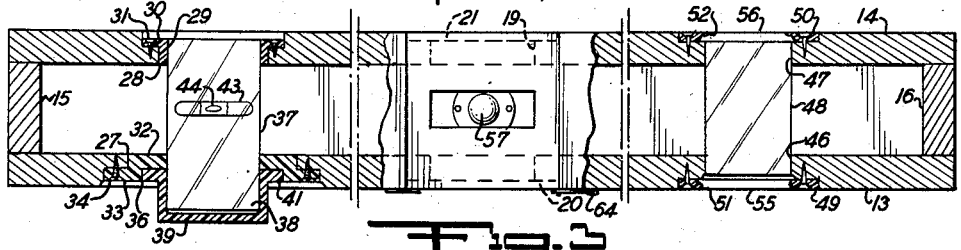

Further objects and advantages of the invention will be apparent from the following description taken in conjunction with the accompanying drawing wherein:

Fig. 1 is a side elevational view of an illuminated combination level constructed in accordance with this invention;

Fig. 2 a top plan view of the level shown in Fig. 1;

Fig. 3 a sectional view taken substantially on the line 3—3 of Fig. 1; and

Figure 4:
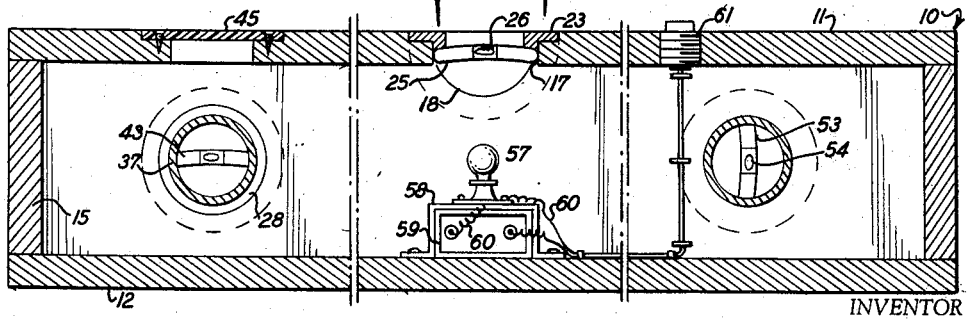

Fig. 4 a sectional view taken substantially on the line 4—4 of Fig. 2.

With continued reference to the drawing, there is shown an illuminated combination level constructed in accordance with this invention and which may well comprise an elongated hollow body 10 having a top wall 11, a bottom wall 12, sidewalls 13 and 14 and end walls 15 and 16. These walls may be formed of wood, plastic or any other suitable material and are assembled together in any suitable manner to provide an elongated hollow box forming the body 10.

The top wall 11 is provided with a transverse slot 17 disposed substantially midway of the length thereof and extending between the side edges of the top wall. Semi-circular openings 18 and 19 are provided in the upper edges of the sidewalls 13 and 14 respectively and such semi-circular openings are in alignment with the transverse slot 17. Transparent members 20 and 21 are secured to the sidewalls 13 and 14 respectively and serve to close the semi-circular openings 18 and 19. A viewing slot 22 is provided in a plate 23 secured to the top wall 11 by screw threaded fastening means or the like 24 and closing the transverse slot 17. Secured to the plate 23 below the viewing slot 22 is a level tube 25 which may be formed of glass or transparent plastic and containing a suitable liquid having an indicating bubble 26 therein.

The bubble 26 will be clearly visible through the viewing slot 22 and also through the transparent members 20 and 21 closing the semi-circular openings 18 and 19. The level tube 25 and bubble 26 are utilized to determine the aspect of a substantially horizontal object or member.

Aligned apertures 27 and 28 are provided in the sidewalls 13 and 14 respectively, between the transverse slot 17 and the end wall 15, and it is to be noted that the aperture 27 is of somewhat larger diameter than the aperture 28. Disposed in the aperture 28 is a bearing member 29 having a flange 30 secured to the sidewall 14 by screw threaded or other suitable fastening means 31. Disposed in the aperture 27 is a transparent bearing member 32 provided with a flange 33 which is secured to the sidewall 13 by screw threaded or other fastening means 34. The transparent flange 33 of the bearing 32 is provided by a degree scale 34 engraved, embossed or otherwise applied thereto and the purpose of this scale will presently appear. It is also to be noted, that the transparent bearing 32 is provided with an annular recess 36, the purpose of which will presently appear.

Rotatably mounted in the bearings 29 and 32 is a transparent hollow cylinder 37 which may be formed of plastic or other suitable material and it is to be noted, that the end 38 of the cylinder 37 projects outwardly of the flange 33 of the bearing 32. A cap 39 is adjustably secured on the projecting end 38 of the cylinder 37 by a set screw or other suitable means 40 and the cap 39 is provided with an annular flange 41 which is rotatably received in the annular recess 36 in the bearing member 32. The flange 41 may be provided with one or more index marks 42 which serve to indicate the angular relationship between the cylinder 37 and the degree scale 35 on the flange 33 of the bearing 32.

A level tube 43 is diametrically disposed within the cylinder 37 and is secured thereto substantially midway between the sidewalls 13 and 14. The level tube 43 may be formed of glass, plastic or any other suitable material and is filled with the usual liquid and provided with an indicating bubble 44. The cap 39 is formed of transparent material and also provided in the top wall 11 of the body 10 is a viewing window 45 of suitable transparent material and consequently, the bubble 44 in the level tube 43 may be observed, either through the window 45 or through the transparent cap 39 secured to the projecting end of the cylinder 37.

It will be seen that with the lower surface of the bottom wall 12 engaging an inclined object, upon rotation of the cylinder 37 to bring the level tube 43 into horizontal position, the angle of inclination of the inclined object may be determined by reading such inclination on the scale 35 opposite the index mark 42. In this manner, any angle of inclination to either side of the vertical may be determined.

Aligned apertures 46 and 47 are provided in the sidewalls 13 and 14 of the body 10 between the transverse slot 17 and the end wall 16 and fixed in the apertures 46 and 47 is a transparent hollow cylinder 48 which may be secured in place by circular plates 49 and 50 secured to the sidewalls 13 and 14 in any suitable manner. The plates 49 and 50 may be provided with apertures 51 and 52 respectively through which the opposite ends of the transparent cylinder 48 are visible. A level tube 53 is secured in the cylinder 48 at substantially right angles to the bottom wall 12 and the level tube 53 may be formed of glass, plastic or any other suitable material and is filled with the usual liquid and provided with an indicating bubble 54. The level tube 53 and indicating bubble 54 serve to indicate the aspect of a substantially vertical member when engaged by the bottom surface of the bottom wall 12. The ends of the cylinder 48 may be closed, but if desired, viewing windows 55 and 56 may be held in place by the plates 49 and 50 and through them the level tube 53 may be observed.

A source of illumination is provided for permitting operation of the level of this invention in poor light conditions and such source may well comprise an electric lamp 57 mounted on a suitable bracket 58 secured to the bottom wall 12 substantially midway of the length thereof and the bracket 58 may also provide means for securing in place a battery 59 which may be connected by suitable conductors 60 to the lamp 57 and to a switch 61 mounted in the top wall 11 of the body 10 for convenient access to the user. Operation of the switch 61 to close the circuit to the lamp 57 will result in energizing the same and the illumination therefrom will serve to illuminate all of the level devices provided in the instrument of this invention and the level tubes 25, 43 and 53 will be clearly visible to the user and also since the flange 33 of the bearing 32 is transparent, the degree scale 35 and the index mark 42 on the flange 41 of the cap 39 will also be clearly visible. The inner surfaces of the walls of the body 10 may be coated with a suitable light reflecting material, such as white paint or other suitable compound, or if desired, these walls may be covered with a layer of a suitable light reflecting metallic foil. In order to permit access to the interior of the body 10, in order to replace the lamp 57 or battery 59, there may be provided a door 62 mounted on the sidewall 13 by hinges 63 and secured in closed position by a suitable latch 64. If desired, of course, the door 62 may be mounted in the wall 14 or other forms of door mounting and securing means may be utilized.

It will be seen that by the above described invention there has been provided a relatively simple illuminated leveling instrument which may be economically manufactured and which may be utilized for all measuring purposes, of which such instruments are capable and in the dark or poor light conditions.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An illuminated combination level comprising an elongated hollow body having top, bottom, side and end walls, a transverse slot in said top wall substantially midway of the length thereof and extending between the side edges of said top wall, a semi-circular opening in the upper edge of each sidewall in alignment with said slot, a plate secured to said top wall and closing said slot, a transparent member secured to each sidewall and closing said semi-circular openings, a viewing slot in said plate extending longitudinally of said body, a level tube secured to said plate below said viewing slot and in alignment therewith, aligned circular apertures in said sidewalls between said semi-circular openings and one end of said body, one of said apertures being of larger diameter, a transparent flanged bearing member fixed in said larger aperture, a degree scale on said flange, a transparent hollow cylinder rotatably mounted in said smaller aperture and said bearing and projecting outwardly of said bearing, a flanged cap adjustably secured to the projecting end of said cylinder, an index mark on the flange of said cap disposed opposite said scale, a diametrically disposed level tube mounted in said cylinder substantially midway between said sidewalls, a viewing window in said top wall above said last named level tube, aligned circular apertures in said sidewalls between said semi-circular openings and the opposite end of said body, a transparent hollow cylinder fixed in said last named apertures, a diametrically disposed level tube mounted in said last named cylinder substantially midway between said sidewalls and perpendicular to said bottom wall, viewing windows closing said last named apertures, a source of illumination comprising an electric lamp mounted in said body substantially midway of the length thereof, a battery for energizing said lamp and a switch in said top wall for controlling said lamp, a door in one sidewall providing access to said lamp and battery and light reflecting means on the inner surface of said body.

2. A device as defined in claim 1, in which said light reflecting means comprises a coating of light reflecting material.

3. A device as defined in claim 1, in which said light reflecting means comprises a layer of light reflecting paper.

4. A device as defined in claim 1, in which said light reflecting means comprises a layer of light reflecting metallic foil.

5. An illuminated combination level comprising an elongated hollow body having top, bottom, side and end walls, a transverse slot in said top wall substantially midway of the length thereof and extending between the side edges of said top wall, a semi-circular opening in the upper edge of each sidewall in alignment with said slot, a plate secured to said top wall and closing said slot, a transparent member secured to each sidewall and closing said semi-circular openings, a viewing slot in said plate extending longitudinally of said body, a level tube secured to said plate below said viewing slot and in alignment therewith, aligned circular apertures in said sidewalls between said semi-circular openings and one end of said body, one of said apertures being of larger diameter, a transparent flanged bearing member fixed in said larger aperture, a degree scale on said flange, a transparent hollow cylinder rotatably mounted in said smaller aperture and said bearing and projecting outwardly of said bearing, a flanged cap adjustably secured to the projecting end of said cylinder, an index mark on the flange of said cap disposed opposite said scale, a diametrically disposed level tube mounted in said cylinder substantially midway between said sidewalls, a viewing window in said top wall above said last named level tube, aligned circular apertures in said sidewalls between said semi-circular openings and the opposite end of said body, a transparent hollow cylinder fixed in said last named apertures, a diametrically disposed level tube mounted in said last named cylinder substantially midway between said sidewalls and perpendicular to said bottom wall, viewing windows closing said last named apertures, a source of illumination comprising an electric lamp mounted in said body substantially midway of the length thereof, a battery for energizing said lamp and a switch in said top wall for controlling said lamp and a door in one sidewall providing access to said lamp and battery.

6. An illuminated combination level comprising an elongated hollow body having top, bottom, side and end walls, a transverse slot in said top wall substantially midway of the length thereof and extending between the side edges of said top wall, a semi-circular opening in the upper edge of each sidewall in alignment with said slot, a plate secured to said top wall and closing said slot, a transparent member secured to each sidewall and enclosing said semi-circular openings, a viewing slot in said plate extending longitudinally of said body, a level tube secured to said plate below said viewing slot and in alignment therewith, aligned circular openings in said sidewalls between said semi-circular openings and one end of said body, one of said apertures being of larger diameter, a transparent flanged bearing member fixed in said larger aperture, a degree scale on said flange, a transparent hollow cylinder rotatably mounted in said smaller aperture and said bearing and projecting outwardly of said bearing, a flanged transparent cap adjustably secured to the projecting end of said cylinder, an index mark on the flange of said cap disposed adjacent said scale, a diametrically disposed level tube mounted in said cylinder substantially midway between said sidewalls, a viewing window in said top wall above said last named level tube, aligned circular apertures in said sidewalls between said semi-circular openings and the opposite end of said body, a transparent hollow cylinder fixed in said last named apertures, a diametrically disposed level tube mounted in said last named cylinder substantially midway between said sidewalls and perpendicular to said bottom wall and a source of illumination comprising an electric lamp mounted in said body substantially midway of the length thereof and a switch in said top wall for controlling said lamp.

References Cited in the file of this patent

UNITED STATES PATENTS

| | | |
|---|---|---|
| 948,570 | Andersen | Feb. 8, 1910 |
| 1,001,206 | McCullough | Aug. 22, 1911 |
| 1,027,533 | Finn | May 28, 1912 |
| 1,036,601 | Frank | Aug. 27, 1912 |
| 1,169,005 | Caswell et al. | Jan. 18, 1916 |
| 1,780,253 | Volz | Nov. 4, 1930 |

FOREIGN PATENTS

| | | |
|---|---|---|
| 892,063 | Germany | Oct. 5, 1953 |